(12) United States Patent
Sewell

(10) Patent No.: US 10,738,784 B2
(45) Date of Patent: Aug. 11, 2020

(54) POWER-LOSS RIDETHROUGH SYSTEM AND METHOD

(71) Applicant: Unico, LLC, Franksville, WI (US)

(72) Inventor: James J. Sewell, Racine, WI (US)

(73) Assignee: Unico, LLC, Franksville, WI (US)

( * ) Notice: Subject to any disclaimer, the term of this patent is extended or adjusted under 35 U.S.C. 154(b) by 0 days.

(21) Appl. No.: 16/122,494

(22) Filed: Sep. 5, 2018

(65) Prior Publication Data

US 2019/0078572 A1 Mar. 14, 2019

Related U.S. Application Data

(60) Provisional application No. 62/558,604, filed on Sep. 14, 2017.

(51) Int. Cl.
*F04D 13/10* (2006.01)
*E21B 43/12* (2006.01)
(Continued)

(52) U.S. Cl.
CPC ............ *F04D 13/10* (2013.01); *E21B 43/128* (2013.01); *F04D 13/086* (2013.01); *F04D 15/0066* (2013.01); *F04D 15/0254* (2013.01); *H02K 7/14* (2013.01); *H02K 11/21* (2016.01); *H02K 11/26* (2016.01); *H02K 11/27* (2016.01);
(Continued)

(58) Field of Classification Search
CPC .... E21B 43/128; E21B 47/011; F04D 13/086; F04D 13/10; F04D 15/0066; F04D 15/0254; H02K 5/132
See application file for complete search history.

(56) References Cited

U.S. PATENT DOCUMENTS 5,521,483 A 5/1996 Pohjalainen et al.
5,625,545 A 4/1997 Hammond
(Continued)

FOREIGN PATENT DOCUMENTS

EP 1073193 A2 1/2001
JP 2014166054 A 9/2014
KR 20080062828 A 7/2008

OTHER PUBLICATIONS

European Search Report for Corresponding European Application No. EP18194205.3 dated Feb. 7, 2019.

*Primary Examiner* — Muhammad S Islam
(74) *Attorney, Agent, or Firm* — Reinhart Boerner Van Deuren P.C.

(57) ABSTRACT

A method of operating an electric induction motor with a variable-speed drive includes determining a voltage level on a DC bus for the drive, and measuring a first magnitude of magnetic flux from a stator of the normally-operating electric motor, determining a normal flux level. The method includes disabling a first output to the drive when the DC bus voltage is less than a first threshold level. The method includes measuring a magnetic flux feedback signal having a phase and second magnitude, estimating a speed of the electric motor, and configuring a second output signal for the drive when the DC bus voltage is greater than a second threshold level. The second output signal matches a signal from the second magnitude and a phase of magnetic flux. The method includes enabling the drive output to restart the electric motor when the magnetic flux is greater than a third threshold value.

19 Claims, 3 Drawing Sheets

(51) Int. Cl.

| | | |
|---|---|---|
| *F04D 13/08* | (2006.01) |
| *H02K 7/14* | (2006.01) |
| *H02K 11/26* | (2016.01) |
| *F04D 15/02* | (2006.01) |
| *H02P 27/04* | (2016.01) |
| *H02K 11/21* | (2016.01) |
| *H02K 11/27* | (2016.01) |
| *F04D 15/00* | (2006.01) |
| *H02P 23/00* | (2016.01) |
| *H02P 1/02* | (2006.01) |
| *H02K 11/00* | (2016.01) |
| *E21B 47/01* | (2012.01) |
| *H02K 5/132* | (2006.01) |

(52) U.S. Cl.
CPC .......... *H02P 1/029* (2013.01); *H02P 23/0004* (2013.01); *H02P 27/047* (2013.01); *E21B 47/011* (2013.01); *F05D 2270/335* (2013.01); *H02K 5/132* (2013.01); *H02K 11/00* (2013.01)

(56) References Cited

U.S. PATENT DOCUMENTS

| | | |
|---|---|---|
| 6,301,130 B1 | 10/2001 | Aiello et al. |
| 2005/0123408 A1* | 6/2005 | Koehl ................. F04D 15/0088 417/53 |
| 2005/0281681 A1 | 12/2005 | Anderson et al. |
| 2012/0326649 A1 | 12/2012 | Patanaik et al. |
| 2017/0159656 A1 | 6/2017 | Tientcheu-Yamdeu et al. |
| 2017/0207733 A1* | 7/2017 | Matsuyama ............ F04D 17/10 |

\* cited by examiner

POWER-LOSS RIDETHROUGH SYSTEM AND METHOD

CROSS-REFERENCE TO RELATED PATENT APPLICATIONS

This patent application claims the benefit of U.S. Provisional Patent Application No. 62/558,604, filed Sep. 14, 2017, the entire teachings and disclosure of which are incorporated herein by reference thereto.

FIELD OF THE INVENTION

This invention generally relates to a system and method for power-loss ride-through.

BACKGROUND OF THE INVENTION

Electric Submersible Pumps are sometimes deployed in areas where externally-supplied electric power, or mains power, is not reliable. Power outages, also referred to as short mains power glitches can cause significant reductions in pump production. In downhole applications, in which the submersible pump moves liquids, e.g., hydrocarbons, up along a piping column extending from the surface to the bottom of the well, while the pump is operating there is a column of liquid in the piping column. If the power to the pump is interrupted for long enough, the liquid could begin to drain back down the piping column causing the vanes of the submersible pump to backspin. In such an instance, the pump cannot be restarted while the pump backspins as the tubing fluid column drains.

Thus, there could be significant downtime and lost production because it would be necessary to wait until the entire piping column drains before the submersible pump could be restarted. Waiting for the entire piping column to drain is necessary once the pump motor starts backspinning, because an attempt to accelerate the motor while it is backspinning to its normal forward motion will cause regeneration, and likely trip the pump drive on DC bus overvoltage.

Embodiments of the invention provide a solution to the problem described above. These and other advantages of the invention, as well as additional inventive features, will be apparent from the description of the invention provided herein.

BRIEF SUMMARY OF THE INVENTION

In one aspect, embodiments of the invention provide a method of operating an electric induction motor with a variable speed drive. The method includes the steps of determining a voltage level on a DC bus for the variable speed drive, and measuring a first magnitude of magnetic flux from a stator of the electric induction motor. The measuring is done while the electric induction motor is operating normally. The measured first magnitude constituting a normal flux level. The method includes disabling a first output signal to the variable-speed drive when the voltage level on the DC bus is less than a first threshold level. Disabling the first output signal shuts off power supplied to the electric motor. The method also calls for measuring a magnetic flux feedback signal from the stator of the electric motor. The magnetic flux feedback signal has a phase, and a second magnitude. The method further includes estimating a rotational speed of the electric motor based on the magnetic flux feedback signal measurement, and configuring a second output signal for the variable-speed drive when the voltage level on the DC bus is greater than a second threshold level. The second output signal is configured to match a signal generated by the measured second magnitude and a phase of magnetic flux from the stator. The method also includes enabling the variable-speed drive output to start the electric induction motor when the measured magnetic flux is greater than a third threshold value.

In a particular embodiment, the method also includes gradually increasing the speed of the electric motor when the measured magnetic flux is less than the third threshold value. The speed may be gradually increased until the measured magnetic flux is greater than a third threshold value.

In certain embodiments, the method calls for taking multiple periodic voltage measurements to determine whether the first threshold level should be modified. In more specific embodiments, taking multiple periodic voltage measurements includes taking a plurality of voltage measurements within 100 seconds, and disabling the variable-speed drive when a loss of power is detected are more than a predetermined number of times.

In other embodiments, the method requires estimating the rotational speed of the electric induction motor without using a transducer. In some specific embodiments, the third threshold value is from 85% to 95% of the normal flux value. Configuring the second output signal for the variable speed drive may include configuring the second output signal using an electronic controller of the variable-speed drive. In some embodiments, the method calls for measuring the magnetic flux feedback signal from the stator of the electric motor using a magnetic flux sensor. In a particular embodiment, the magnetic flux sensor is a flux circuit on a digital signal processor.

In another aspect, embodiments of the invention provide a method of operating an electric submersible pump having an electric motor with a variable-speed pump drive. The method includes the steps of determining a voltage level on a DC bus of the variable-speed pump drive, and measuring a first magnitude of magnetic flux from a stator of the electric motor. The measuring is done while the electric motor is operating normally. The measured first magnitude constitutes a normal flux level. The method also includes disabling an output of the variable-speed pump drive when the voltage level on the DC bus is less than a first threshold level. Disabling the output shuts off power supplied to the submersible pump. The method further requires measuring a magnetic flux feedback signal from the stator of the electric motor. The magnetic flux feedback signal has a phase, and a second magnitude. The method further includes estimating a rotational speed of the electric motor based on the magnetic flux feedback signal measurement, and configuring a second output signal for the variable-speed drive when the voltage level on the DC bus is greater than a second threshold level. The second output signal is configured to match a signal generated by the measured second magnitude and a phase of magnetic flux from the stator. The method further includes enabling the variable-speed pump drive output to start the submersible pump when the measured magnetic flux is greater than a third threshold value.

In particular embodiments, the method calls for estimating the rotational speed of the electric motor without using a transducer. In certain embodiments, the third threshold value is from 85% to 95% of the normal flux value. In more specific embodiments, the variable-speed pump drive operates at 460 volts, and wherein the first threshold value is less than or equal to 500 volts. In other embodiments, the variable-speed pump drive operates at 460 volts, and wherein the second threshold value is greater than or equal to 575 volts.

Determining a voltage level on the DC bus may include taking multiple periodic voltage measurements to determine whether the first threshold level should be modified. Taking multiple periodic voltage measurements may include taking a plurality of voltage measurements within 100 seconds, and disabling the variable-speed drive when a loss of power is detected are more than a predetermined number of times.

The method may further include configuring the second output signal using an electronic pump controller. Further, in some embodiments, the method calls for measuring the magnetic flux feedback signal from the stator of the electric motor using a magnetic flux sensor. In a particular embodiment, the magnetic flux sensor is a flux circuit on a digital signal processor.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of the invention described herein disclose a method for keeping an electric drive and electric motor operating through short electrical power glitches. The embodiments disclosed herein will generally describe the invention with respect to its application with electric submersible pumps, such as those used in the oil and gas well artificial lift industry. However, Applicants realize that the invention is not limited to its application with electric submersible pumps, and could be employed in any capacity in which machines using electric drives and motors that are susceptible to power loss.

Figure 1:
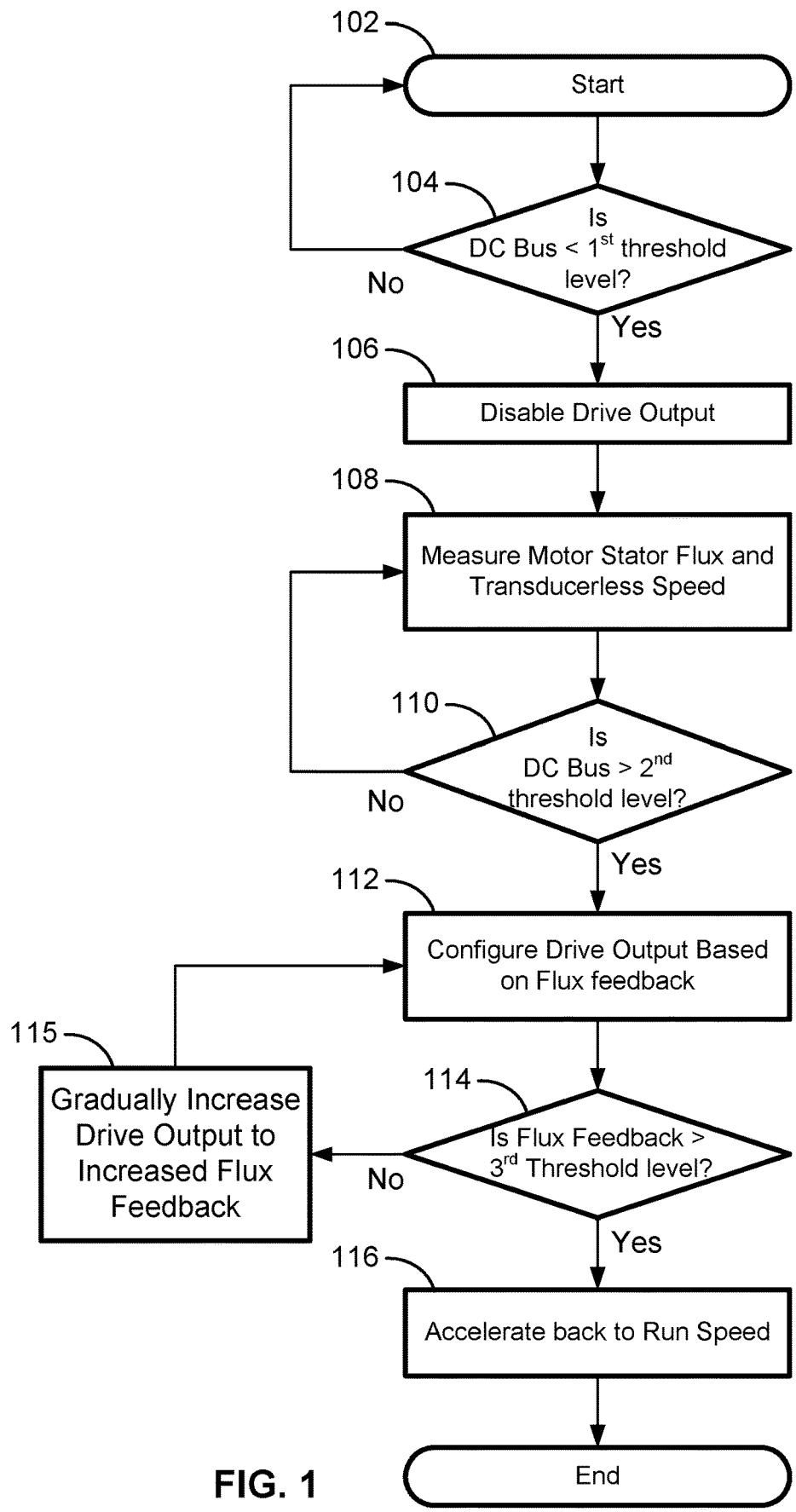
FIG. 1 is a flowchart illustrating the power-loss ridethrough process, according to an embodiment of the invention.

FIG. 1 is a flowchart illustrating the power-loss ridethrough process, according to an embodiment of the invention. At the start 102 of the power-loss ridethrough process, the electric motor, or in the oil and gas artificial lift context, the electric motor for a submersible pump, is operating normally. In embodiments of the claimed invention, the electric motor has a variable-speed drive.

A variable-speed drive (also termed variable-frequency drive, adjustable-frequency drive, AC drive, micro drive, or inverter drive) is a type of adjustable-speed drive used in electro-mechanical drive systems to control AC motor speed and torque by varying motor input frequency and voltage. Variable-speed drives may also be used in a variety of process control applications. The use of variable-speed drives in process control may involve matching the electric motor speed to the required task in order to compensate for changes in the process variables.

Variable-speed drives have found uses in a number of pump and fan applications, particularly where flow control is involved. For example, variable-speed drives may provide soft-start capabilities in order to decrease electrical stresses and line voltage sags associated with full-voltage motor start-ups, especially when driving loads with relatively high-inertia.

Typical drives have an AC input power source and some type of conversion apparatus, usually using solid-state devices, for converting the fixed AC input voltage into a variable-voltage and/or variable-frequency output. One such type of drive is disclosed in U.S. Pat. No. 5,625,545 issued to Hammond, which is incorporated herein by reference. A variable-speed drive that operates with reduced harmonics for operating a three-phase load, such as a three-phase AC motor, is disclosed by U.S. Pat. No. 6,301,130 issued to Aiello et al., which is incorporated herein by reference.

The first step involves measuring a voltage on a DC bus for the variable-speed drive 104. In embodiments of the invention, this step will involve the inclusion of a voltage sensor on the variable-speed drive, allowing for voltage measurements to be taken and processed, as needed, by a variable-speed drive controller. During this step, a magnetic flux measurement from the stator of the electric motor is taken to determine a normal flux level for the electric motor. In the process of FIG. 1, only when the voltage measurement 104 is below a first threshold value does the process advance to the second step of disabling a variable-speed drive output 106. Falling below the first threshold voltage indicates that electrical power to the electric motor has been interrupted. In response to the interruption in power, the variable-speed drive controller responds by disabling a variable-speed drive output 106. The variable-speed drive output is coupled to the electric motor in order to control operation of the motor. As such, disabling the variable-speed drive output cuts off the electric power being supplied to the electric motor.

However, even after the electric power supply is shut off, inertia causes the rotor of the electric motor to keep spinning. Due to the spinning rotor, the electric motor continues to generate a magnetic flux signal, also referred to herein as the flux feedback signal. Embodiments of the invention also include sensors to measure this flux feedback signal. As with the voltage measurement described above, the magnetic flux sensor allows for flux feedback signal measurements to be taken and processed, as needed, by the variable-speed drive controller. In a particular embodiment, the flux sensor is a flux circuit on a digital signal processor for the variable-speed drive and power-loss ridethrough system. As such, the next step in the process of FIG. 1 is measurement of the flux feedback signal 108. Based on this measurement, the variable-speed drive controller determines a magnitude and phase of the flux feedback signal, and based on this information, also determines an estimated rotational speed of the spinning rotor without using a transducer. In particular embodiments of the invention, this measurement of the flux feedback signal 108 is repeated periodically until electric power is restored to the electric motor.

In oil and gas well artificial lift applications using an electric submersible pump, in order to minimize production losses resulting from the power interruption, the electric motor must be restarted before the piping column starts to drain back into the well causing the submersible pump to start backspinning. There is a limited amount of capacitance in the DC bus of the variable-speed drive, and the DC bus voltage must be kept high enough during power glitches to prevent the drive from faulting on bus undervoltage. Disabling the variable-speed drive output 106 slows the rate of decay for the DC bus voltage. Measuring the flux feedback signal 108 allows the controller to match the variable-speed drive output to the spinning rotor when the electrical power is restored.

To determine if power has been restored, a measurement of the DC bus voltage 110 is taken. When the measured DC bus voltage is above a second threshold level, this indicates that electric power has been restored to the electric motor and the process of FIG. 1 advances to the next step of configuring the variable-speed drive output based on the flux feedback signal 112. In this step, the controller analyzes the magnitude and phase of the flux feedback signal, estimates the rotational speed of the rotor on the electric motor, and determines the characteristics of the signal required to be transmitted from the variable-speed drive output to cause the electric motor to spin at a speed matching that of the powerless spinning rotor.

In the oil and gas well artificial lift application, referred to above, an embodiment of the invention includes a variable-speed drive for a submersible pump that operates normally at 460 volts. The first threshold level may be set at approximately 500 volts, where a DC bus voltage of less than 500 volts indicates a loss of power. An exemplary system could also include a fault detection feature in which a number of detected power losses (e.g., from 3 to 8 power-loss detections) during a pre-determined period, (e.g., from 50 to 150 seconds) triggers a fault warning, or may result in a shutdown of the variable-speed drive output, and hence the submersible pump. The repeated power-loss detections could indicate that threshold level has been set incorrectly, prompting a modification of the first threshold to a higher value. In an exemplary embodiment, the second threshold level is set at a level from 565 volts to 590 volts.

The flux feedback signal is measured 114 to determine if the flux feedback signal is greater than a third threshold level. The third threshold level may be designated as a percentage of the normal flux level as determined during step 104 described above. If the flux feedback signal measurement indicates that the flux level is greater than the third threshold level, the variable-speed drive controller accelerates the electric motor back to its desired or programmed run speed 116.

If the flux feedback signal measurement indicates that the flux level is less than the third threshold level, the drive out is gradually increased in order to increase the flux level 115. The process then returns to step 112 in which the drive output is configured based on the flux feedback signal from newly increased flux level. Then the flux feedback signal is measured 114 again to determine if the flux feedback signal is greater than the third threshold level. This process repeats until the measured flux feedback signal is greater than the third threshold level allowing the process to proceed to step 116 where the variable-speed drive controller accelerates the electric motor back to its desired or programmed run speed.

Figure 2:
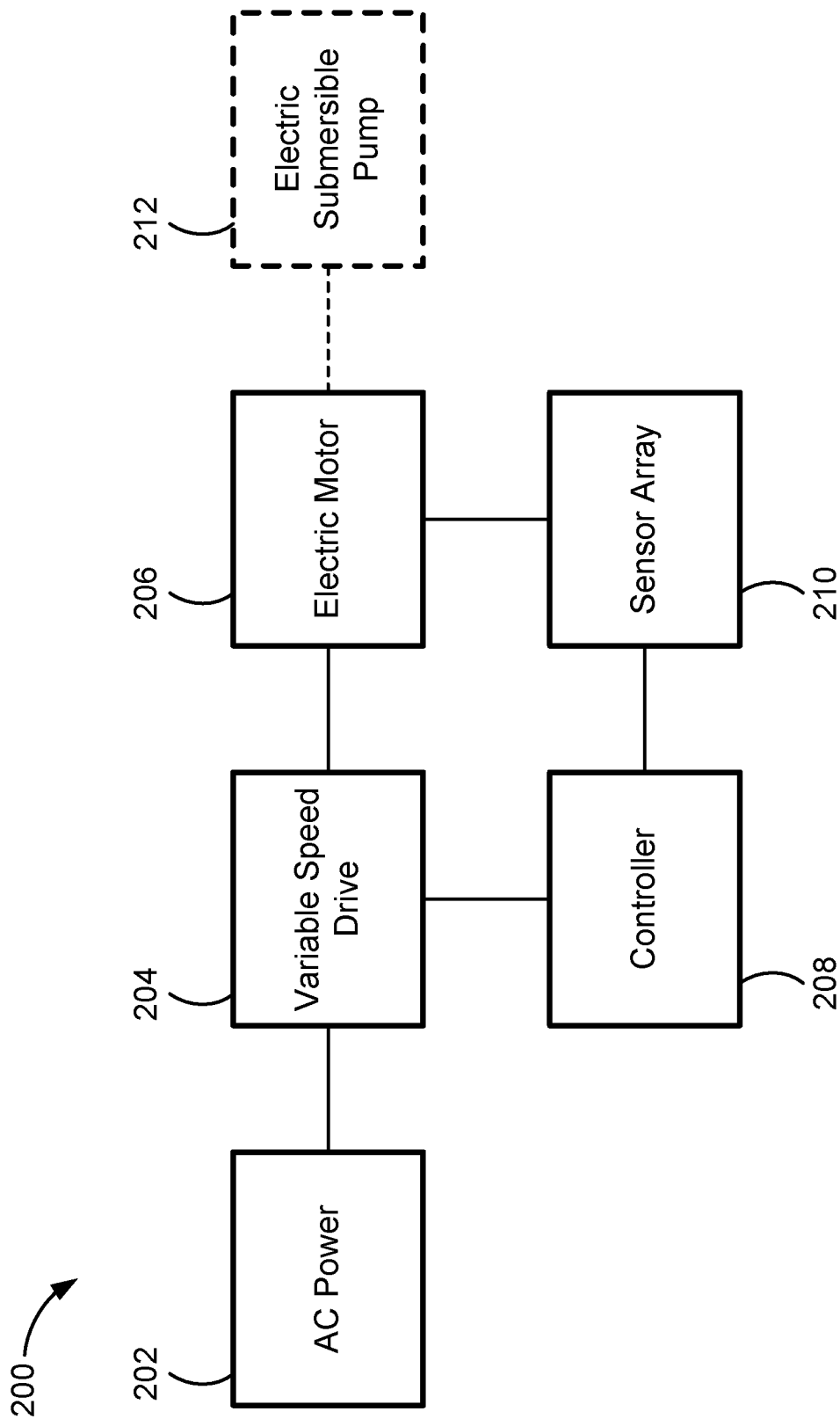
FIG. 2 is a schematic block diagram of a power-loss ridethrough system, according to an embodiment of the invention.

FIG. 2 is a schematic block diagram of a power-loss ridethrough system 200, according to an embodiment of the invention. In the embodiment of FIG. 2, an AC power supply 202 provides electrical power to a variable-speed drive 204 for an electric motor 206. In some embodiments, the variable speed drive 204 controls the speed of the electric motor 206 (typically an induction or synchronous motor) by adjusting the frequency of the power supplied to the motor 206. The electric motor 206 may be a three-phase induction motor, though, in certain embodiments, a single-phase motor or synchronous motor may be used.

A controller 208 controls operation of the variable-speed drive 204. In a particular embodiment, the controller 208 includes a solid-state power electronics conversion system. Exemplary variable-speed drive controllers may include subsystems such as a power inverter, which may incorporate IGBT switching devices, and a rectifier with DC link. However, a variety of topologies may be used within the scope of the invention, and embodiments of the invention are not limited to any particular type of controller.

The electric motor 206 is coupled to a sensor array 210 that includes, but is not limited to, magnetic flux sensors, current sensors, and voltage sensors. In certain embodiments, the magnetic flux sensor is a flux circuit on a digital signal processor.

The sensor array 210 is also coupled to the controller 208 so that the controller 208 receives the output from each of the sensors in the sensor array 210. Information from the sensor array 210 allows the controller to estimate motor speed and to configure the variable-speed-drive output as necessary to control the electric motor 206. The controller 208 is configured, with respect to its hardware and software programming, to carry out the process illustrated in FIG. 1 and described hereinabove.

An optional electric submersible pump 212 is coupled to the electric motor 206. The electric submersible pump 212 is shown in dashed lines indicating that this component is optional, and could be replaced by other devices operated by the electric motor 206, which would still be within the scope of the present invention.

Figure 3:
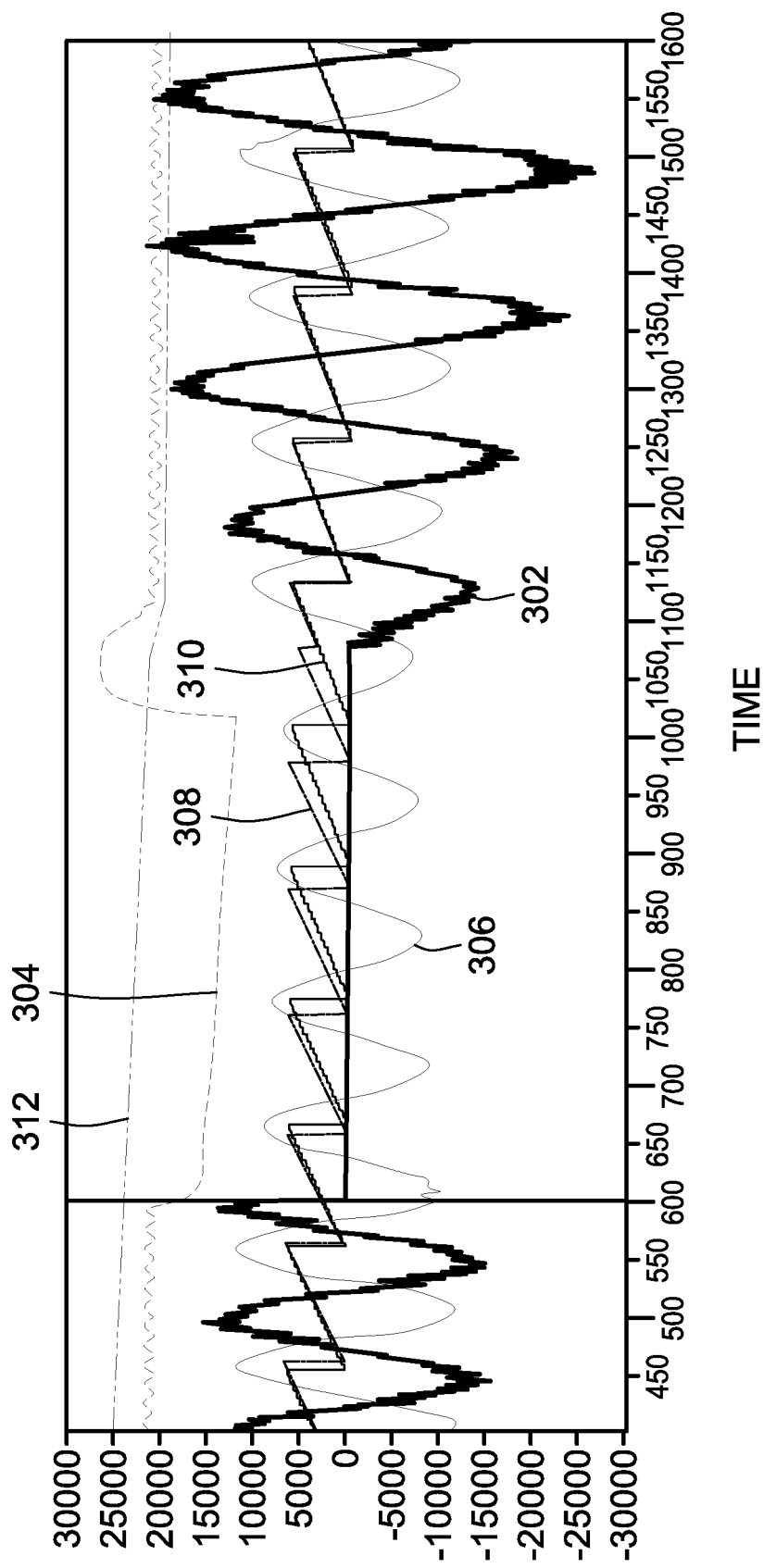
FIG. 3 is a graphical illustration of the electrical signals generated as a result of the power-loss ridethrough process, according to an embodiment of the invention.

FIG. 3 is a graphical illustration of the electrical signals generated as a result of the power-loss ridethrough process, according to an embodiment of the invention. As can be seen from the graph of FIG. 3, powerloss is detected around sample time [600], where the U-axis current trace 302 goes to zero as the drive output is shut off. The DC bus voltage trace 304 rapidly declines during the power outage before the variable-speed drive output is turned off, then falls more slowly as the only loads on the DC bus are the discharge resistors, cooling fan loads, and controller power supply loads.

The U-axis flux feedback trace 306 can be seen slowly decreasing in magnitude between sample times [600] and [1100] as the motor flux decays. Power is restored around sample time [1025] where the DC bus voltage rises rapidly. The variable-speed drive output is re-enabled around sample time [1075] where the U-axis current trace 302 resumes. The command flux angle ac gamma signal, shown as the narrow black sawtooth trace 308 is written with the flux theta feedback angle, the wide brown sawtooth trace 310 at this point to ensure the flux command angle matches the flux feedback angle. The flux trace 306 rapidly increases at first, then increases more slowly between sample times [1100] and [1500]. After sample time [1500], the output speed slowly ramps up, as can be seen in the velocity feedback trace 312.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of operating an electric induction motor with a variable speed drive, the method comprising the steps of:
   determining a voltage level on a DC bus for the variable speed drive;
   measuring a first magnitude of magnetic flux from a stator of the electric induction motor, the measuring being done while the electric induction motor is operating normally, the measured first magnitude constituting a normal flux level;
   disabling a first output signal to the variable-speed drive when the voltage level on the DC bus is less than a first threshold level, wherein disabling the first output signal shuts off power supplied to the electric motor;
   measuring a magnetic flux feedback signal from the stator of the electric motor, the magnetic flux feedback signal having a phase, and a second magnitude;
   estimating a rotational speed of the electric motor based on the magnetic flux feedback signal measurement;
   configuring a second output signal for the variable-speed drive when the voltage level on the DC bus is greater than a second threshold level, wherein the second output signal is configured to match a signal generated by the measured second magnitude and a phase of magnetic flux from the stator;
   enabling a variable-speed drive output to start the electric induction motor when the measured magnetic flux is greater than a third threshold value.

2. The method of claim 1, wherein determining a voltage level on the DC bus comprises taking multiple periodic voltage measurements to determine whether the first threshold level should be modified.

3. The method of claim 2, wherein taking multiple periodic voltage measurements to determine if the first threshold level should be modified comprises taking a plurality of voltage measurements within 100 seconds, and disabling the variable-speed drive when a loss of power is detected more than a predetermined number of times.

4. The method of claim 1, wherein estimating the rotational speed of the electric induction motor comprises estimating the rotational speed without using a transducer.

5. The method of claim 1, wherein the third threshold value is from 85% to 95% of the normal flux value.

6. The method of claim 1, wherein configuring the second output signal for the variable speed drive comprises configuring the second output signal using an electronic controller of the variable-speed drive.

7. The method of claim 1, wherein measuring the magnetic flux feedback signal from the stator of the electric motor comprises measuring the magnetic flux feedback signal from the stator of the electric induction motor using a magnetic flux sensor.

8. The method of claim 7, wherein the magnetic flux sensor is a flux circuit on a digital signal processor.

9. The method of claim 1, further comprising gradually increasing the speed of the electric induction motor when the measured magnetic flux is less than the third threshold value.

10. A method of operating an electric submersible pump having an electric motor with a variable-speed pump drive, the method comprising the steps of:
    determining a voltage level on a DC bus of the variable-speed pump drive;
    measuring a first magnitude of magnetic flux from a stator of the electric motor, the measuring being done while the electric motor is operating normally, the measured first magnitude constituting a normal flux level;
    disabling an output of the variable-speed pump drive when the voltage level on the DC bus is less than a first threshold level, wherein disabling the output shuts off power supplied to the submersible pump;
    measuring a magnetic flux feedback signal from the stator of the electric motor, the magnetic flux feedback signal having a phase, and a second magnitude;
    estimating a rotational speed of the electric motor based on the magnetic flux feedback signal measurement;
    configuring a second output signal for the variable-speed drive when the voltage level on the DC bus is greater than a second threshold level, wherein the second output signal is configured to match a signal generated by the measured second magnitude and a phase of magnetic flux from the stator;
    enabling a variable-speed pump drive output to start the submersible pump when the measured magnetic flux is greater than a third threshold value.

11. The method of claim 10, wherein estimating the rotational speed of the electric motor comprises estimating the rotational speed without using a transducer.

12. The method of claim 10, wherein the third threshold value is from 85% to 95% of the normal flux value.

13. The method of claim 10, wherein the variable-speed pump drive operates at 460 volts, and wherein the first threshold value is less than or equal to 500 volts.

14. The method of claim 10, wherein the variable-speed pump drive operates at 460 volts, and wherein the second threshold value is greater than or equal to 575 volts.

15. The method of claim 10, wherein determining a voltage level on the DC bus comprises taking multiple periodic voltage measurements to determine whether the first threshold level should be modified.

16. The method of claim 15, wherein taking multiple periodic voltage measurements to determine if the first threshold level should be modified comprises taking a plurality of voltage measurements within 100 seconds, and disabling the variable-speed drive when a loss of power is detected are more than a predetermined number of times.

17. The method of claim 10, wherein configuring the second output signal for the variable speed drive comprises configuring the second output signal using an electronic pump controller.

18. The method of claim 10, wherein measuring the magnetic flux feedback signal from the stator of the electric motor comprises measuring the magnetic flux feedback signal from the stator of the electric motor using a magnetic flux sensor.

19. The method of claim 18, wherein the magnetic flux sensor is a flux circuit on a digital signal processor.

\* \* \* \* \*

UNITED STATES PATENT AND TRADEMARK OFFICE
CERTIFICATE OF CORRECTION

PATENT NO. : 10,738,784 B2
APPLICATION NO. : 16/122494
DATED : August 11, 2020
INVENTOR(S) : James J. Sewell It is certified that error appears in the above-identified patent and that said Letters Patent is hereby corrected as shown below:

In the Claims

Column 7, Line 53, incorrectly reads "shuts off power supplied to the electric motor;" but should read -- shuts off power supplied to the electric induction motor; --

Column 7, Line 55, incorrectly reads "of the electric motor," but should read -- of the electric induction motor, --

Column 7, Line 57, incorrectly reads "estimating a rotational speed of the electric motor based" but should read -- estimating a rotational speed of the electric induction motor based --

Column 8, Line 22, incorrectly reads "motor comprises measuring the magnetic flux feedback" but should read -- induction motor comprises measuring the magnetic flux feedback --

Signed and Sealed this
Twenty-second Day of September, 2020

Andrei Iancu
*Director of the United States Patent and Trademark Office*